Patented Apr. 18, 1950

2,504,667

UNITED STATES PATENT OFFICE 2,504,667

PROCESS FOR PREPARING EMULSIONS OF WATER WET POLYVINYL ACETAL RESINS

Richard D. Dunlop, Texas City, Tex., assignor to Monsanto Chemical Company, St. Louis, Mo., a corporation of Delaware No Drawing. Application January 9, 1948, Serial No. 1,488

4 Claims. (Cl. 260—29.6)

This invention relates to a process for preparing aqueous dispersions of polyvinyl acetal resins. More particularly, the invention relates to a process for preparing aqueous dispersions of polyvinyl butyral resins.

In the preparation of polyvinyl acetal resins in organic solvents followed by coagulation with water a grainy coagulate is obtained which retains about 40% by weight of water unless it is dried at elevated temperatures. It would be economically advantageous to use this water wet resin in the preparation of aqueous dispersions of the resin, but attempts to do so have heretofore met with failure.

An object of this invention is to provide aqueous dispersions of polyvinyl acetal resins.

A further object is to provide aqueous dispersions of polyvinyl acetal resins starting with a water wet resin made without drying.

Another object is to provide aqueous dispersion of polyvinyl butyral resins starting with water wet polyvinyl butyral.

These and other objects are attained by mixing water wet polyvinyl acetal resins with plasticizer and a fatty acid until the major portion of the water is expressed from the mixture, cooling the mixture, adding an alkali or ammonia and inverting the dispersion.

The following example is given in illustration and is not intended as a limitation on the scope of this invention. Where parts are mentioned, they are parts by weight.

*Example*

5800 parts of a polyvinyl butyral resin containing approximately 40% water by weight were mixed with 1400 parts of butyl ricinoleate and 147 parts of oleic acid in a jacketed dispersion type mixer. Steam at 100 p. s. i. (about 328° F.) was used in the jacket to heat the mixture. Soon after the mixing action was started, water was expressed from the mass and continued to be expressed for about 10 minutes.

When water no longer was freely expressed from the mixture, the temperature of the mixer jacket was reduced to about 20° C. and mixing continued for about 10 minutes. At this point the mass in the mixer was a dispersion of water in plasticized polyvinyl butyral resin, water being present in the proportion of about 11% by weight of the resin. To this dispersion 21 parts of sodium hydroxide in the form of a 25% aqueous solution was added during continued mixing for about 1 or 2 minutes. Then about 500 parts of water were added slowly to the mixture under continuous mixing action to cause phase inversion. A dispersion of plasticized polyvinyl butyral resin in water was obtained which could be further diluted with water in any desired proportions. The dispersion contained no hard, insoluble or coagulated particles of resin. It could be cast on smooth surfaces to provide clear homogeneous films after evaporation of the water. It could also be used to coat or impregnate textile and paper webs.

The dispersing agents used to obtain the stable dispersions of this invention are ammonium, amine or alkali metal salts of long chain fatty acids. Examples of such dispersing agents are ammonium, alkali metal, and amine, e. g., morpholine, salts of long chain fatty acids such as lauric acid, oleic acid, stearic acid, palmitic acid, coconut oil fatty acids, etc. To obtain dispersions from water wet polyvinyl acetal resins, the acid component is added to the water wet resin along with plasticizers and other conventional additives such as fillers, pigments, dyes, lubricants, etc. and the mixture is masticated at elevated temperatures until the excess of water is removed. This procedure results in a dispersion of water in resin.

The alkaline component of the dispersing agent is not added to the mixture until excess water is removed and the water-in-resin dispersion is formed. It is then added as a hydroxide in the case of ammonia and the alkali metal salts or as an unmodified compound in the case of amines such as morpholine. This procedure forms the dispersing agent in situ and allows for the smooth inversion of the dispersion on the addition of water to obtain a stable resin-in-water dispersion which may be diluted with water to the desired solids content. The addition of the dispersing agent in entirety at any stage in the process of this invention at least partially prevents the formation of a water-in-resin dispersion and any such dispersion obtained cannot be completely inverted.

The resins which may be used to make the dispersions of this invention are resins obtained by condensing polyvinyl alcohol or partially saponified polyvinyl esters with compounds or mixtures of compounds containing an active carbonyl group such as ketones and aldehydes including acetone, methyl ethyl ketone, methyl isopropyl ketone, formaldehyde, acetaldehyde, propionaldehyde, butyraldehyde, hexaldehyde, octaldehyde, benzaldehyde, cinnamaldehyde, crotonaldehyde, acrolein, methacrolein, etc. The condensation reaction is generally carried out in organic solvent to provide a resin solution. The resin is obtained therefrom by precipitation with water. The resin is obtained in the form of granules containing from about 30 to about 50% of absorbed water. Previous to this invention it has been found necessary to remove the absorbed water by drying at elevated temperatures since no process for successfully using the water wet resin in forming dispersions has heretofore been developed.

The resins of this invention may be plasticized with well known plasticizers, such as butyl ricinoleate, dialkyl phthalates, glycollates including methyl and ethyl phthallyl ethyl glycollates, dibutyl sebacate, triethylene glycol dihexoate, etc. Other conventional additives such as fillers, pigments, dyes, and lubricants may be mixed into the resin in the first step of the process.

The dispersions produced by this process are stable and smooth and may be infinitely diluted with water. The resin in the dispersion has a uniform particle size and contains substantially no unplasticized or unmoldable particles. They may be used to prepare clear or colored films or to impregnate or coat textile, paper or metallic webs.

It is obvious that many variations may be made in the products and processes of this invention without departing from the spirit and scope thereof as defined in the appended claims.

What is claimed is:

1. A process for producing aqueous dispersions of polyvinyl acetal resins which contain from 30 to 50% by weight of water in the presence of a dispersing agent taken from the group consisting of the ammonium, alkali metal and amine salts of long chain fatty acids, which comprises mixing the polyvinyl acetal resin with a plasticizer and the acid component of the dispersing agent at about 328° F. until the major portion of the water is expressed from the resin, cooling the mixture, adding the alkaline component of the dispersing agent and thereafter adding water with constant agitation to invert the dispersion.

2. A process as in claim 1 wherein the polyvinyl acetal resin is a polyvinyl butyral resin.

3. A process as in claim 1 wherein the dispersion agent is sodium oleate.

4. A process as in claim 3 wherein the polyvinyl acetal resin is a polyvinyl butyral resin.

RICHARD D. DUNLOP.

REFERENCES CITED

The following references are of record in the file of this patent:

UNITED STATES PATENTS

| Number | Name | Date |
|--------|------|------|
| 2,431,800 | Geiges | Dec. 2, 1947 |